Dec. 14, 1926.
J. A. KNIGHT
1,611,143
REBOUND ABSORBER FOR VEHICLES
Filed Dec. 11, 1919
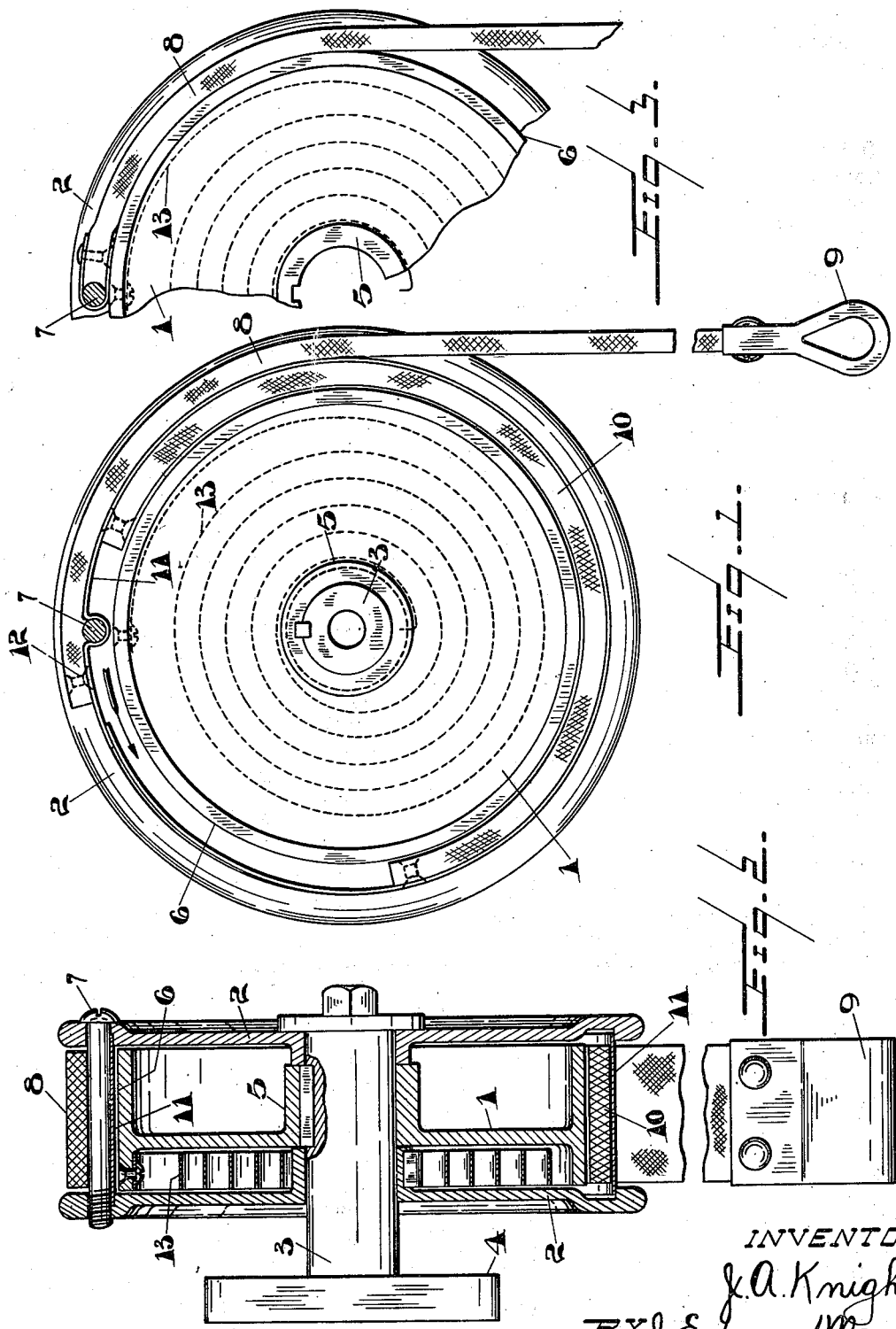
INVENTOR.
J. A. Knight.
BY J. Edward Maybee.
ATTY.

Patented Dec. 14, 1926.

1,611,143

UNITED STATES PATENT OFFICE.

JOHN A. KNIGHT, OF HAMILTON, ONTARIO, CANADA, ASSIGNOR TO JOHN WARREN WATSON COMPANY, OF PHILADELPHIA, PENNSYLVANIA, A CORPORATION OF PENNSYLVANIA.

REBOUND ABSORBER FOR VEHICLES.

Application filed December 11, 1919. Serial No. 344,201.

It is well known that much discomfort is caused to the occupants of an automobile or other vehicle in which the body is spring suspended, and sometimes damage to the car, by the acquired momentum or rebound of the body after the springs have been compressed by the passage of the car over inequalities in the road.

Many devices have been put on the market to absorb this rebound, which are commonly known as rebound snubbers or shock absorbers, but most of them possess objectionable features depending on their type. Some shock absorbers have the effect of increasing the resiliency of the spring support, thus eliminating a great deal of the discomfort caused by small road inequalities, but failing to check the rebound caused by a large inequality. Such shock absorbers are of material benefit only in cases where the spring suspension of the automobile to which they are applied has not been designed to have sufficient resiliency.

Other shock absorbers check the rebound from a large inequality very effectively, but also check with practically the same or greater resistance the rebound from a small inequality, thus causing discomfort from small inequalities which the ordinary spring suspension, without the shock absorber, would render almost negligible. Still other shock absorbers check the rebound with a resistance proportioned to the acquired momentum of the body with respect to the axle. Such shock absorbers are slow in acting as the momentum must be acquired before they come into operation. Others of the type dependent on the displacement of a fluid, though free of some of the above objections, are expensive and liable to wear and get out of order.

My object therefore is to devise a shock absorber, or rebound absorber as I prefer to term it, which will be free from the above set forth defects, and in which the rebound checking resistance is easily adjusted. I attain my object by so constructing the absorber that the rebound is checked by a frictional resistance the major portion of which is substantially proportional to the force tending to produce the rebound which resistance takes immediate effect at the time rebound commences, or, otherwise stated, in my rebound absorber the major portion of the frictional resistance opposing separation of the body and axle of the vehicle increases substantially in proportion to the extent of the approach of the axle to the body from a position of zero compression of the springs connecting the body and axle.

The advantage of a rebound absorbing resistance, the major portion of which is substantially proportioned to vehicle spring compression, such as is obtained with my construction, is apparent from the service which it is required to render. All road inequalities are of two classes, rises and depressions in the road surface. The purpose of the vehicle spring is to permit the body to move with a smooth motion, while the wheels vibrate up and down over these inequalities. The body instead of receiving the hard, sudden blows delivered to the wheels, receives blows delivered by the compressed springs. Such blows when resulting from the rough road conditions are of sufficient value to cause the body to rebound violently if the spring action is not controlled.

A resistance opposing separation of the body and axle of the vehicle, the major portion of which is not proportioned to vehicle spring compression, tends to oppose too severely the dropping of the wheels into a road depression under decreased spring compression, and to hold the springs in compression, causing them through their decreased cushioning power to transmit to the body a severe blow, when the wheels strike the opposite side of the depression. Such resistance tends also to insufficiently oppose the rebound action from increased spring compression, due to a severe rise in the road. Any adjustment of such resistance to efficiently control spring action, due to one class of road inequality, makes it less efficient to control spring action due to the other class of road inequality.

A rebound absorbing resistance, the major portion of which varies in substantial proportion to vehicle spring compression, can, however, be adjusted to control efficiently spring action due to inequalities of either class, and it is essentially the novel arrangement and construction of my device which enables it to perform this function, and which I claim as constituting novelty in construction and arrangement of parts, and functioning of parts as compared with other similar devices.

The invention is hereinafter more fully described and illustrated in the accompanying drawings in which Fig. 1 is a side elevation, with one side disk removed, of my improved rebound absorber;

Fig. 2 a cross section of the same; and

Fig. 3 a side elevation, partly broken away, of a slight modification of the invention, one side disk being removed.

In the drawings like numerals of reference indicate corresponding parts in the different figures.

1 is a snubber part adapted to be connected to one of two parts of a vehicle, either the body or some part rigidly connected with the body, or the axle or some part rigidly connected with the axle. 2 is the second snubber part also adapted to be connected to the body or axle of the vehicle. In practice I prefer to connect the snubber part 1 with the body of the vehicle and the snubber part 2 to the axle of the vehicle, or parts rigidly connected therewith. It will be understood, of course, that the device is applicable for use in absorbing the rebound of any two spring connected parts subject to shock causing departure from the normal relative position of the two parts and the terms "axle" and "body" used in the claims are to be taken as including any such parts.

The two snubber parts are relatively movable in correspondence with changes in the relative vertical position of the vehicle body and axle, and the parts are provided with braking surfaces adapted to be overlapped in accordance with the relative position of the body and axle. The device is also so arranged that friction creating contact of one part against the other is increased in some proportion to the extent of approach of the axle to the body.

The part 1 is mounted on a stud 3 which extends from a plate 4 by means of which it may be secured to the body of the vehicle. In the preferred construction the part 1 is formed with a hub 5 keyed on the stud 3. The part 1 is a drum provided with a cylindrical braking surface 6. The part 2 of the absorber is preferably formed of two disks journalled on the stud 3 and connected by a bolt 7. To this second part 2 is connected the strap 8, which is provided at one end with a loop 9 or other means, by means of which it may be connected with the axle of the vehicle. This strap passes round the cylindrical braking surface 6 of the part 1, which it is adapted to directly or indirectly engage. The strap 8 thus forms the braking surface of the part 2 (see Fig. 3) and also the means of connecting the part 2 with the axle of the vehicle.

In practice it is desirable that the strap does not directly engage the cylindrical braking surface 6 owing to the wear on the strap which would ensue, and I therefore provide the strap with a special flexible braking band 10, by means of which the strap is adapted to engage the cylindrical braking surface 6 (see Figs. 1 and 2). In my preferred construction, this flexible brake band, which is of any ordinary material employed for that purpose, is secured to a resilient divided metal band 11, which is provided with a loop passing round the bolt 7. The strap 8 is also riveted to this metal band as shown at 12. A pull on the strap 8 thus tends to rotate the part 2 of the obsorber, in which motion the brake band 10 participates. The part 2 of the absorber is normally acted upon by a spring tending to rotate it in the direction indicated by arrow to cause the strap 8, which is in effect part of the second snubber part 2, to wrap itself round a greater arc of braking surface 6 than the normal, and in proportion to the approach of the axle to the body. It follows therefore that the circumference of the drum should be approximately equal to the range of relative movement of the body and axle. A coil spring 13 is provided to rotate the second snubber part, one end being secured to the snubber part 1 and the other end to the snubber part 2. As the braking effect, to attain my object, must depend on the overlapping of the strap on the drum as largely as possible, this spring must be sufficiently long and flexible to give nearly even tension throughout its range of action.

The mode of operation of the device is substantially as follows. With the vehicle standing still, the position of the parts of the absorber would be substantially as shown with a short section of the strap 8 overlapping the cylindrical surface 6 and consequently a similar short section of the brake band 10 pressed against said surface. When the vehicle is in motion and passes over an inequality in the road, the body and axle approach one another and the vehicle springs are further compressed. The strap 8 is thus slackened and the spring 13 rotates the member 2 in a counter-clockwise direction and winds a longer section of the strap 8 and brake band 10 on the cylindrical surface 6.

As the pressure of the vehicle springs overcomes the inertia of the body, the latter moves away from the axle. This upward motion of the body produces a tension on the strap 8 tending to revolve the part 2 in a clockwise direction, which rotation is opposed by the spring 13 thus causing the brake band 10 to be pressed with considerable force against the braking surface 6, causing a braking effect which opposes the clockwise rotation of the part 2 and puts an increased tension on the strap, which tension is in some proportion to the total length of the section of the strap overlapping the surface 6 and opposes the upward motion of the body relative to the axle and absorbs the force of the rebound.

As the body moves upwards and the part 2 rotates in a clockwise direction, the overlap of the strap 8 and the length of the portion of the brake band 10 pressed against the surface 6 becomes shorter and the braking effect less, thus permitting of freer relative movement of the body and axle. It will be seen therefore that the braking effect which opposes rebound increases as the body and axle approach and decreases as they separate and therefore the absorbing effect is proportionate to the force of the road shocks to which the car is subjected tending to cause rebound.

In practice the arc of overlap of the strap on the cylinder braking surface 6 will vary from approximately 0° to 300° or to put it otherwise, the circumference of the drum is substantially equal to the possible relative overlap of the strap on the drum.

The principle of operation hereinbefore set forth may be embodied in constructions differing materially in detail from that hereindescribed and shown.

What I claim as my invention is:—

1. In mechanism adapted for use in connection with two relatively movable elements for checking their relative motion in one direction, a drum adapted to be secured to one of said elements, a friction shoe, in the form of an incomplete or split ring, slidably positioned around said drum, a spring operatively connected to said shoe for advancing one end thereof around said drum, a fourth member secured to said shoe and extending beyond its said advanced end, and a flexible member secured to said extended portion of said fourth member and adapted to be connected to said other element.

2. In mechanism adapted for use in connection with two relatively movable elements for checking their relative motion in one direction, a drum adapted to be secured to one of said elements, a friction shoe, in the form of an incomplete or split ring, slidably positioned around said drum, a spring operatively connected to said shoe for advancing one end thereof around said drum, a fourth member secured to said shoe and extending beyond its said advanced end, a flexible member secured to said extended portion of said fourth member and adapted to be connected to said other element, said fourth member lying between said friction shoe and said flexible member.

3. In mechanism adapted for use in connection with two relatively movable elements for checking their relative motion in one direction, a drum adapted to be secured to one of said elements, a flexible member adapted to be secured to the other of said elements, a spring connecting said drum and said flexible member and tending to increasingly overlay the flexible member around the drum, the end of the outer convolution of said spring being held in fixed relation with said drum and the end of the inner convolution of said spring being held in fixed relation with one end of said flexible member.

4. In mechanism adapted for use in connection with two relatively movable elements for checking their relative motion in one direction, a drum adapted to be secured to one of said elements, a flexible member adapted to be secured to the other of said elements, a spring connected at its outer end to said drum and at its inner end to means for transmitting the power of said spring to said flexible member to increasingly overlay the flexible member around the drum, and a bearing for said means, said bearing lying within the inner convolution of said spring.

5. In mechanism adapted for use in connection with two relatively movable elements for checking their relative motion in one direction, a drum adapted to be secured to one of said elements, a friction shoe, in the form of an incomplete or split ring, slidably positioned around said drum, a spring operatively connected to said shoe for advancing one end thereof around said drum, a fourth member secured to said shoe and extending beyond its said advanced end, a flexible member secured to said extended portion of said fourth member and adapted to be connected to said other element, said fourth member substantially surrounding said friction shoe and lying between said friction shoe and said flexible member.

6. In mechanism adapted for use in connection with two relatively movable elements for checking their relative motion in one direction, a drum adapted to be secured to one of said elements, a friction member in contact with said drum, a spring operatively connected to said friction member for advancing one end thereof around said drum, a fourth member secured to said friction member and extending beyond its said advanced end, and a flexible member secured to said extended portion of said fourth member and adapted to be connected to said other element.

7. In mechanism adapted for use in connection with two relatively movable elements for checking their relative motion in one direction, a drum adapted to be secured to one of said elements, a friction member in contact with said drum, a spring operatively connected to said friction member for advancing one end thereof around said drum, a fourth member secured to said friction member and extending beyond its said advanced end, and a flexible member secured to said extended portion of said fourth member and adapted to be connected to said other element, said fourth member lying between said friction member and said flexible member.

8. In mechanism adapted for use in connection with two relatively movable elements for checking their relative motion in one direction, a drum adapted to be secured to one of said elements, a friction member in contact with said drum, a spring operatively connected to said friction member for advancing a part thereof around said drum, a fourth member secured to said friction member and extending beyond the said advanced part, and a flexible member secured to said extended portion of said fourth member and adapted to be connected to said other element.

9. In mechanism adapted for use in connection with two relatively movable elements for checking their relative motion in one direction, a drum adapted to be secured to one of said elements, a friction member in contact with said drum, a spring operatively connected to said friction member for advancing a part thereof around said drum, a fourth member secured to said friction member and extending beyond the said advanced part, and a flexible member secured to said extended portion of said fourth member and adapted to be connected to said other element, said fourth member lying between said friction member and said flexible member.

10. In mechanism adapted for use in connection with two relatively movable elements for checking their relative motion in one direction, a drum member adapted to be secured to one of said elements, a second member revolvable about said drum member, a spring operatively connecting said drum member and said second mentioned member for relatively revolving them, a friction member between said drum member and said second mentioned member, said second mentioned member having a portion extending away from contact with said friction member, and a flexible member secured to said non-contacting portion of said second mentioned member and adapted to be secured to said other element.

11. In mechanism adapted for use in connection with two relatively movable elements for checking their relative motion in one direction, a drum member adapted to be secured to one of said elements, a second member revolvable about said drum member, a spring operatively connecting said drum member and said second mentioned member for relatively revolving them, a friction member between said drum member and said second mentioned member, said second mentioned member having a portion extending away from contact with said friction member, and a flexible member secured to said non-contacting portion of said second mentioned member and adapted to be secured to said other element, the parts being so formed and associated as to cause a decrease in the force required to relatively revolve said drum member and said second mentioned member as they are relatively revolved by said flexible member.

12. In mechanism adapted for use in connection with two relatively movable elements for checking their relative motion in one direction, a drum member adapted to be secured to one of said elements, a second member revolvable about said drum member, a spring operatively connecting said drum member and said second mentioned member for relatively revolving them, said second mentioned member having a portion adapted to transmit pressure directly down against said drum member and having a portion not so adapted, and a flexible member secured to said non-adapted portion of said second mentioned member and adapted to be secured to said other element.

13. In mechanism adapted for use in connection with two relatively movable elements for checking their relative motion in one direction, a drum member adapted to be secured to one of said elements, a second member revolvable about said drum member, a spring operatively connecting said drum member and said second mentioned member for relatively revolving them, a flexible member secured to said second mentioned member and adapted to be secured to said other element, said second mentioned member having a portion adapted to transmit pressure from said flexible member directly down against said drum member and having a portion not so adapted, said flexible member being secured to said second mentioned member at said portion of said second mentioned member which is not adapted for transmitting pressure as above mentioned.

Signed at Toronto this 25th day of November 1919.

JOHN A. KNIGHT.